United States Patent
Choi

(10) Patent No.: US 9,946,355 B2
(45) Date of Patent: Apr. 17, 2018

(54) SYSTEM AND METHOD FOR OPERATING A MOBILE DEVICE USING MOTION GESTURES

(71) Applicant: Samsung Electronics Co., Ltd., Gyeonggi-do (KR)

(72) Inventor: Sejin Choi, San Jose, CA (US)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/842,206

(22) Filed: Sep. 1, 2015

(65) Prior Publication Data

US 2017/0060251 A1    Mar. 2, 2017

(51) Int. Cl.
*G06F 3/01* (2006.01)
*G06K 9/00* (2006.01)
*H04N 5/232* (2006.01)

(52) U.S. Cl.
CPC ......... *G06F 3/017* (2013.01); *G06K 9/00268* (2013.01); *G06K 9/00288* (2013.01); *G06K 9/00711* (2013.01); *H04N 5/232* (2013.01); *H04N 5/23219* (2013.01); *G06K 2009/00738* (2013.01)

(58) Field of Classification Search
CPC ........................................................ G06F 3/017
USPC ........................................................ 345/156
See application file for complete search history.

(56) References Cited

U.S. PATENT DOCUMENTS 8,558,759 B1 * 10/2013 Prada Gomez ......... G06F 3/017
                                                           345/156
9,076,033 B1 * 7/2015 Barron ..................... G06F 3/017
2008/0170776 A1 * 7/2008 Albertson ............... G06F 21/35
                                                           382/154
2009/0175509 A1   7/2009 Gonion et al.
2009/0303176 A1 * 12/2009 Chen ....................... G06F 3/017
                                                           345/156
2010/0159981 A1 * 6/2010 Chiang ................... G06F 3/017
                                                           455/556.1
2013/0155255 A1 * 6/2013 Yu ....................... H04N 5/23203
                                                           348/164

(Continued)

FOREIGN PATENT DOCUMENTS

| EP | 2746979 A1 | 6/2014 |
| EP | 2908217 A1 | 1/2015 |
| WO | 2008107733 A1 | 9/2008 |

OTHER PUBLICATIONS

Foreign Communication From a Related Counterpart Application, European Application No. 16186707.2-1902, Extended European Search Report dated Jan. 20, 2017, 7 pages.

*Primary Examiner* — Jason Olson

(57) ABSTRACT

A mobile device responsive to hand gestures or hand motions detected by a camera. The mobile device comprises: i) transmit path circuitry and receive path circuitry configured to communicate with a wireless network; ii) a memory configured to store a plurality of application programs; iii) a digital camera configured to record an image and to generate a live video stream; and iv) processing circuitry configured to analyze the live video stream and to detect therein a gesture made by a person in the recorded image. In response to detection of the gesture, the processing circuitry performs an operation associated with the detected gesture, such as taking a picture of the image or playing music.

20 Claims, 3 Drawing Sheets

(56) References Cited

U.S. PATENT DOCUMENTS

| | | | |
|---|---|---|---|
| 2013/0194287 A1* | 8/2013 | Nicholson | G09G 5/36 345/547 |
| 2013/0300644 A1* | 11/2013 | Chen | G06F 3/017 345/156 |
| 2013/0342636 A1* | 12/2013 | Tian | G06F 3/017 348/14.08 |
| 2014/0010417 A1 | 1/2014 | Hwang | |
| 2014/0013417 A1* | 1/2014 | Sakai | G06F 3/005 726/16 |
| 2014/0104440 A1* | 4/2014 | Sampathkumaran | G06K 9/00288 348/207.1 |
| 2014/0157210 A1* | 6/2014 | Katz | G06F 3/017 715/863 |
| 2015/0019459 A1* | 1/2015 | Han | G06F 3/04883 706/11 |
| 2015/0103205 A1 | 4/2015 | Choi et al. | |
| 2015/0350551 A1* | 12/2015 | Harris | H04N 5/23216 348/231.99 |
| 2016/0085958 A1* | 3/2016 | Kang | G06F 21/40 726/19 |
| 2016/0170492 A1* | 6/2016 | DeBattista | G06F 3/017 345/156 |
| 2016/0241783 A1* | 8/2016 | Fukui | H04N 5/23245 |

\* cited by examiner

SYSTEM AND METHOD FOR OPERATING A MOBILE DEVICE USING MOTION GESTURES

TECHNICAL FIELD

The present application relates generally to image capture devices and, more specifically for a mobile device capable of being operated by motion gestures detected by a camera.

BACKGROUND

Digital camera devices have become ubiquitous. In addition to dedicated digital cameras (e.g., a handheld photo camera, a video camera), many other types of devices now incorporate digital cameras, including computers and smartphones. Mobile phones with built-in, high quality, digital cameras are perhaps the most popular communication platform in existence. Consumers use mobile phones to take pictures of others as well as pictures of themselves (i.e., selfies) and then upload the pictures to various social media platforms.

Digital cameras are not without some user-unfriendly aspects, however. Taking a photo of oneself (and/or others) from a remote position with a digital camera, particularly a mobile phone camera, is not easy to do. If a smartphone user wants to take a selfie picture (including of a group that includes the user), the user may take a close-up shot by extending his or her arm outward or by using a selfie stick. Alternatively, the user may take a longer distance picture using some sort of timer or remote control function in the smartphone. But, in that situation, after propping the smartphone up in a position to take the picture, the user then must rush into position in the picture frame and then freeze in position until the timer goes off. A remote control device may allow the user and others to prepare for the picture. However, this requires a piece of equipment separate from the digital camera that may get lost or may break.

Therefore, there is a need in the art for improved methods and apparatuses for operating a digital camera system. In particular, there is a need for a digital camera system that can be remotely operated by a user without the need for a remote controller separate from the digital camera system.

SUMMARY

To address the above-discussed deficiencies of the prior art, it is a primary object to provide a mobile device comprising: i) transmit path circuitry and receive path circuitry configured to communicate with a wireless network; ii) a memory configured to store a plurality of application programs; iii) a digital camera configured to record an image and to generate a live video stream; and iv) processing circuitry configured to analyze the live video stream and to detect therein a gesture made by a person in the recorded image. In response to detection of the gesture, the processing circuitry performs an operation associated with the detected gesture.

In one embodiment, in response to detection of the gesture, the processing circuitry causes the digital camera to take a picture of the image.

In another embodiment, in response to detection of the gesture, the processing circuitry causes the digital camera to take a picture of the image after a predetermined delay.

In still another embodiment, a duration of the delay is determined by the detected gesture.

In yet another embodiment, in response to detection of the gesture, the processing circuitry launches one of the plurality of application programs stored in the memory.

In a further embodiment, in response to detection of the gesture, the processing circuitry launches a music player application program stored in the memory.

In a still further embodiment, the processing circuitry is further configured to detect in the live video stream a face of the person who made the gesture in the recorded image and to determine if the person who made the gesture in the recorded image is an authorized user of the mobile device.

In a yet further embodiment, the processing circuitry performs the operation associated with the detected gesture in response to a determination that the person who made the gesture in the recorded image is an authorized user of the mobile device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
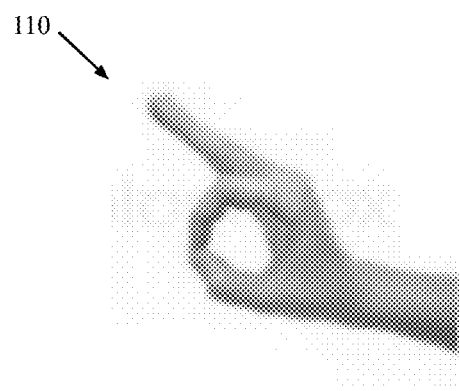
FIG. 1A illustrates an "OK" hand gesture for controlling an operation of a digital camera system according to one embodiment of the disclosure.
Figure 1B:
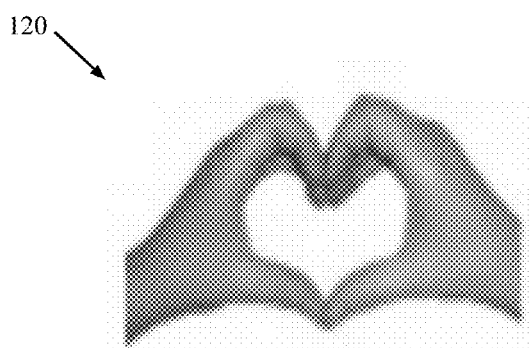
FIG. 1B illustrates "heart" hand gesture for controlling an operation of a digital camera system according to one embodiment of the disclosure.
Figure 2:
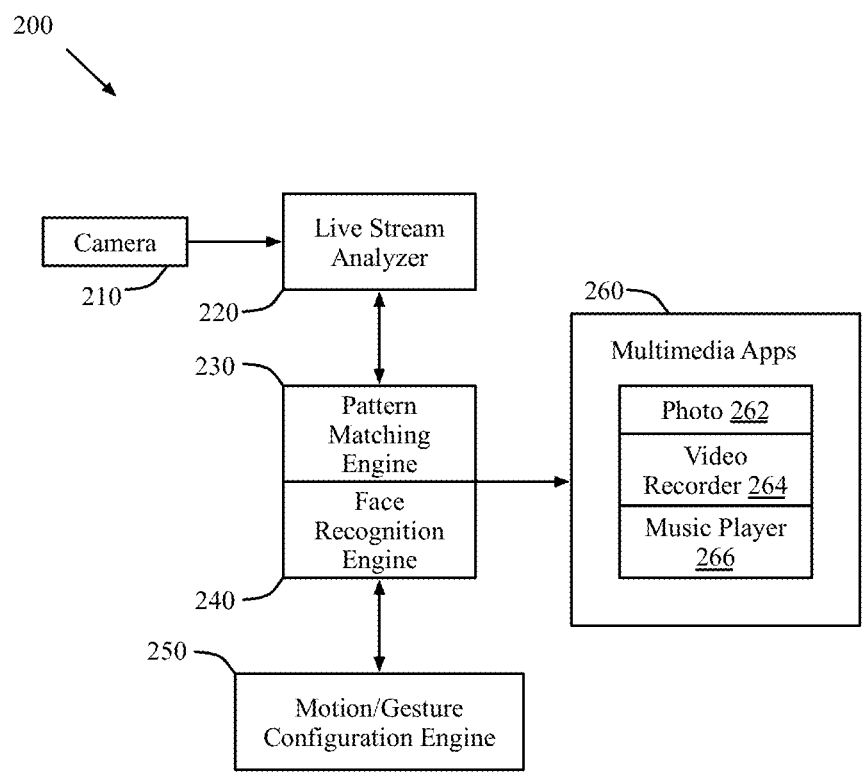
FIG. 2 illustrates a digital camera system architecture according to one embodiment of the disclosure.
Figure 3:
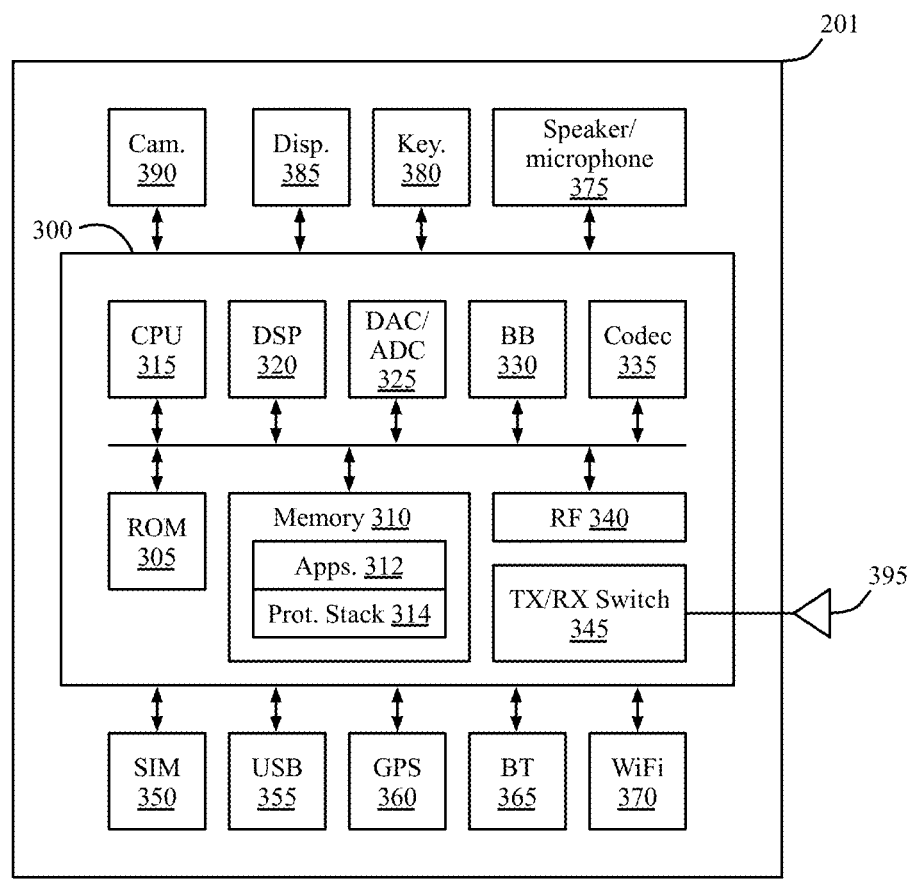
FIG. 3 illustrates a mobile phone incorporating a digital camera system according to one embodiment of the disclosure.

FIGS. 1 through 3, discussed below, and the various embodiments used to describe the principles of the present disclosure herein are by way of illustration only and should not be construed in any way to limit the scope of the disclosure. Those skilled in the art will understand that the principles of the present disclosure may be implemented in any suitably arranged digital camera system.

FIG. 1A illustrates "OK" hand gesture 110 for controlling an operation of a digital camera system according to one embodiment of the disclosure. FIG. 1B illustrates "heart" hand gesture 120 for controlling an operation of a digital camera system according to one embodiment of the disclosure. According to the principles of the present disclosure, a pre-configured hand gesture or hand motion is detected by a smartphone or digital camera from a live video stream and an action or operation in the smartphone or digital camera is triggered or activated. By way of example, if a smartphone camera detects OK hand gesture 110, the smartphone may take a picture. Alternatively, if the smartphone camera detects heart hand gesture 120, the smartphone may play music.

The smartphone camera may take the picture immediately after detecting OK hand gesture 110 or may issue a beep or other sound notification and delay, for example, three seconds in order to allow the user to stop making OK hand gesture 110 and pose in a preferred position. In an advantageous embodiment, the user may make a hand gesture or motion that modifies a parameter of the smartphone camera. By way of example, the user may hold up three fingers to set up a three second timer delay before the smartphone camera takes a picture. Optionally, this may be combined with another hand gesture. For instance, the user may make OK hand gesture 110 to command the smartphone camera to take a picture. After receiving an acknowledgement beep from the smartphone, the user may hold up three fingers for a three second delay or four fingers for a four second delay.

In an exemplary embodiment, the smartphone or digital camera may be setup by the manufacturer with pre-configured hand gestures (e.g., heart hand gesture 120, OK hand gesture 110) stored in memory that control the operation of the device. Advantageously, the smartphone or digital camera may include the capability of learning customized gestures selected by the user. By way of example, the user may launch a camera application on the smartphone and select a Learn mode. The user may then stand in the picture frame and make a customized gesture for several seconds (e.g., circling arms, two "thumbs up" hand gestures, two hand up, palms towards camera, and the like). The camera application records the customized gesture for several second and emits a beep when done. The camera application then processes and stores the customized gesture for subsequent pattern recognition.

Once the customized gesture is detected and stored, the user can then associate the customized gesture with a selected operation of the smartphone (e.g., Start Video Record, Stop Video Record, Start Audio Record, Initiate Phone Call, and the like). In an advantageous embodiment, the smartphone camera is configure to perform face recognition and is capable of identifying the face of the smartphone user. This enables the smartphone to associate a hand gesture or other body motion with the authenticated user of the smartphone. This prevents the smartphone application from being accidentally or deliberately controlled by a person or persons in the camera frame other than the user of the smartphone.

FIG. 2 illustrates digital camera system architecture 200 according to one embodiment of the disclosure. Digital camera system architecture 200 comprises camera 210, live stream analyzer 220, pattern matching engine 230, face recognition engine 240, motion/gesture configuration engine 250, and memory 260, which stores a plurality of multimedia application programs, including photo application 262, video recorder application 264, and music player application 266. Camera 210 records the live images in front of camera 210 and outputs a live image video stream to live stream analyzer 220. Live stream analyzer 220 captures frames from the live image stream and sends the frames to pattern matching engine 230 and face recognition engine 240.

Pattern matching engine 230 is configured to detect and identify pre-configured gestures and/or customized gestures in a video frame and face recognition engine 240 is configured to detect and identify the face of the user of digital camera system architecture 200. If the user's face is recognized and authenticated and a pre-configured gesture or customized gesture is detected, the detected gesture then invokes an associated application program in memory 260. Motion/gesture configuration engine 250 learns customized gestures selected by the user and associates the customized gestures with particular operations, as described above.

FIG. 3 illustrates mobile phone 201, which incorporates a digital camera system according to one embodiment of the disclosure. Mobile phone 201 is one particular embodiment of digital camera system architecture 200 in FIG. 2. Mobile phone 201 includes a camera, a live stream analyzer, a pattern matching engine, a face recognition engine, a motion/gesture configuration engine, and a memory as described above in FIG. 2.

Mobile phone 201 comprises core circuitry 300, which includes read-only memory (ROM) 305, random access memory (RAM) 310, central processing unit (CPU) 315, digital signal processor (DSP) 320, digital-to-analog converter (DAC)/analog-to-digital converter (ADC) circuitry 325, baseband (BB) circuitry block 330, codec circuitry block 335, radio frequency (RF) circuitry block 340, transmit (TX)/receive (RX) switch 345, and antenna 395.

In one embodiment, ROM 305 may store a boot-routine and other static data and RAM 310 may store an operating system (not shown), applications 312, and protocol stack 314. In an advantageous embodiment, ROM 305 and RAM 310 may comprise a single electronically erasable memory, such as a Flash memory, that is used in conjunction with a conventional RAM memory that is used to store dynamic data. Applications in memory 312 may include a social presence application (i.e., RCS Presence), an IP multimedia subsystem (IMS) framework that delivers IP multimedia services, a Calendar application, and specific Social Network Site (SNS) applications (e.g., Facebook, Twitter), and the like. Mobile phone 201 further comprises SIM card interface 350, USB interface 355, GPS receiver 360, Bluetooth (BT) transceiver 365, WiFi (or WLAN) transceiver 370, speaker and microphone circuitry block 375, keyboard 380, display 385, and camera 390. In some embodiment, keyboard 380 and display 385 may be implemented together as a touch screen display.

CPU 315 is responsible for the overall operation of mobile phone 201. In an exemplary embodiment, CPU 315 executes applications 312 and protocol stack 314. CPU 315 runs the application layer and a wide variety of applications may be run in a smart phone implementation. Applications 312 may include audio, video, and image/graphics applications. CPU 315 may run applications 312 that support various audio formats such as MP3, MP4, WAV, and rm. CPU 315 may run image applications 312 that support JPEG image formats and video applications 312 that support video formats (e.g., MPEG-1 to MPEG-5). CPU 315 may support various operating systems (not shown), such as Symbian, java, android, RT-Linux, Palm, and the like. For time critical applications, CPU 315 runs a real-time operating system (RTOS). In addition to the physical layer, there are other layers, including protocol stack 314, that enable mobile phone 201 to work with a network base station. In an exemplary embodiment, protocol stack 314 is ported on CPU 315.

DAC/ADC circuitry block 325 converts analog speech signals to digital signals, and vice versa, in mobile phone 201. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 330 may be implemented as part of DSP 320, which executes many of the baseband processing functions (i.e., physical layer, Layer 1, or L1 functions). BB circuitry block 300 may be ported on DSP 320 to meet the latency and power requirements of mobile phone 201. BB circuitry block 330 converts voice and data to be carried over the air interface to I/Q baseband signals.

BB circuitry block 330 may change from modem to modem for various air interface standards, such as GSM, CDMA, Wimax, LTE, HSPA, and others. BB circuitry block 330 is often referred to as the physical layer, or Layer 1, or L1. For mobile phones that work on GSM networks, the baseband part (Layer 1) running on DSP 320 and the protocol stack 314 running on CPU 315 are based on the GSM standard. For CDMA mobile phones, the Layer 1 and protocol stack 314 are based on the CDMA standard, and so on, for the LTE and HSPA standards-based mobile phones.

For speech or audio inputs, codec circuitry block 335 may compress and decompress the signal to match the data rate to the frame in which the data is sent. By way of example, codec circuitry block 335 may convert speech at an 8 KHz sampling rate to a 13 kbps rate for a full rate speech traffic channel. To do this, a residually excited linear predictive coder (RELP) speech coder may be which compresses 260 bits into a 20 millisecond duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a Viterbi decoder (used in receive path). Interleaving may be done for the data, which helps in spreading the error over time, thereby helping the receiver de-interleave and decode the frame correctly.

RF circuitry block 340 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 395 is a metallic object that converts and electromagnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of mobile phone 201, antenna 395 may support different wire-area standards, including GSM, CDMA, LTE, and WiMAX, as well as short-range standards, including WiFi (WLAN), Bluetooth, and so on.

If antenna 395 comprises only one antenna used for both transmit and receive operations at different times, the TX/RX switch 345 couples both the transmit (TX) path and the receive (RX) path to antenna 395 at different times. TX/RS switch 345 is controlled automatically by DSP 320 based on a GSM frame structure with respect to the physical slot allocated for that particular GSM mobile phone in both the downlink and the uplink. For frequency division duplexing (FDD) systems, TX/RX switch 345 may be implement as a diplexer that acts as filter to separate various frequency bands.

Mobile phone 201 provides connectivity with laptops or other devices using WiFi (or WLAN) transceiver 370, BT transceiver 365, and universal serial bus (USB) interface 355. Mobile phone 201 also uses GPS receiver 360 in applications 312 that require position information. If mobile phone 201 is a conventional smart phone, applications 312 may include many popular applications, such as Facebook, Twitter, a browser, and numerous games that come pre-installed with mobile phone 201.

Speaker and microphone circuitry block 375 comprises microphone circuitry (or mic) that converts acoustic energy (i.e., air pressure changes caused by speech or other sounds) to electrical signals for subsequent processing. Speaker and microphone 375 further comprise speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

Mobile phone 201 preferably includes camera 390. Presently, almost all mobile phones feature a camera module. Camera 390 may comprise a 12 megapixel, 14 megapixel, or a 41 megapixel camera.

Display 385 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 380 may comprise a simple matrix type keypad that contains numeric digits (0 to 9), alphabetic characters (A to Z), special characters, and specific function keys. In a more advanced embodiment for a smart phone implementation, keypad 380 may be implemented in the mobile phone software, so that keyboard 380 appears on display 385 and is operated by the user using the touch of a finger tip.

Accordingly, in the exemplary embodiment in FIG. 3, camera 390 captures a live video stream, similarly to camera 210 in FIG. 2. Applications 312 in memory 310 include multimedia applications similar to photo application 262, video recorder application 264, and music player application 266 in memory 260 in FIG. 2. Finally, CP 315 is configured to perform the same functions as live stream analyzer 220, pattern matching engine 230, face recognition engine 240, and motion/gesture configuration engine 250 in FIG. 2.

The systems and methods disclosed herein enable a user to dynamically associate any motion with a multimedia application (e.g., a finger gesture for various timer operation, taking a photo with okay sign, etc.). The association between a selected multimedia application and a random gesture/motion by a user is freely configurable. Thus, instead of being limited by a remote controller and predetermined actions, the present disclosure provides a mechanism to customize a wide range of operations for the any selected motion/gestures.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system comprising:
a digital camera configured to record an image and to generate a live video stream;
a memory configured to store a plurality of gestures corresponding to a plurality of operations, wherein the plurality of gestures comprise one or more pre-configured gestures and one or more customized gestures; and
processing circuitry configured to;
analyze the live video stream;
detect a gesture in captured frames from the live video stream of the recorded image;
identify the gesture made;
in response to identification of the gesture, select, as a function of the identified gesture, an operation from the plurality of operations, wherein each of the operations is associated with a respective gesture; and
perform the operation corresponding to the identified gesture; and
when the system is in a learn mode, the processor is further configured to;
capture frames from the live image stream for a predetermined period of time;
provide an indication at an end of the predetermined period of time;
learn a customized gesture selected from the captured frames; and
associate the selected customized gesture with a selected system operation.

2. The system as set forth in claim 1, wherein, when the gesture comprises a first gesture, the processing circuitry causes the digital camera to take a picture of the image.

3. The system as set forth in claim 2, wherein, when the gesture comprises a second gesture, the processing circuitry causes the digital camera to take a picture of the image after a predetermined delay.

4. The system as set forth in claim 3, wherein a duration of the predetermined delay is determined by the second gesture.

5. The system as set forth in claim 1, wherein, when the gesture comprises a third gesture, the processing circuitry launches an application program stored in a memory of the system.

6. The system as set forth in claim 1, wherein, when the gesture comprises a fourth gesture, the processing circuitry launches a music player application program stored in a memory of the system.

7. The system as set forth in claim 1, wherein the processing circuitry is further configured to detect, in the live video stream, a face of a person who made the gesture in the recorded image.

8. The system as set forth in claim 7, wherein the processing circuitry is further configured to determine if the person who made the gesture in the recorded image is an authorized user of the system.

9. The system as set forth in claim 8, wherein the processing circuitry performs the operation corresponding to the identified gesture in response to a determination that the person who made the gesture in the recorded image is an authorized user of the system.

10. The system as set forth in claim 1, wherein the system comprises a mobile phone.

11. A mobile device comprising:
transmit path circuitry and receive path circuitry configured to communicate with a wireless network;
a memory configured to store:
a plurality of application programs, and
a plurality of gestures corresponding to a plurality of operations, wherein the plurality of gestures comprise one or more pre-configured gestures;
a digital camera configured to record an image and output a live video stream; and
processing circuitry configured to:
analyze the live video stream;
detect a gesture in captured frames from the live video stream of the recorded image;
identify the gesture made when a pattern in one of the captured frames matches with one of the plurality of stored gestures;
in response to identification of the gesture, select, as a function of the identified gesture, a corresponding operation from the plurality of operations; and
perform the corresponding operation of the identified gesture; and
when the processing system is processing a camera application in a learn mode, the processing circuitry is further configured to;
capture frames from the live image stream for a predetermined period of time;
provide an indication at an end of the predetermined period of time;
learn a customized gesture selected from the captured frames; and
associate the selected customized gesture with a selected system operation.

12. The mobile device as set forth in claim 11, wherein, when the gesture comprises a first gesture, the processing circuitry causes the digital camera to take a picture of the image.

13. The mobile device as set forth in claim 12, wherein, when the gesture comprises a second gesture, the processing circuitry causes the digital camera to take a picture of the image after a predetermined delay.

14. The mobile device as set forth in claim 13, wherein a duration of the predetermined delay is determined by the second gesture.

15. The mobile device as set forth in claim 11, wherein, when the gesture comprises a third gesture, the processing circuitry launches one of the plurality of application program stored in the memory.

16. The mobile device as set forth in claim 11, wherein, when the gesture comprises a fourth gesture, the processing circuitry launches a music player application program stored in the memory.

17. The mobile device as set forth in claim 11, wherein the processing circuitry is further configured to detect, in the live video stream, a face of a person who made the gesture in the recorded image.

18. The mobile device as set forth in claim 17, wherein the processing circuitry is further configured to determine if the person who made the gesture in the recorded image is an authorized user of the mobile device.

19. The mobile device as set forth in claim 18, wherein the processing circuitry performs the operation corresponding to the identified gesture in response to a determination that the person who made the gesture in the recorded image is an authorized user of the mobile device.

20. A method for use of a mobile device comprising transmit path circuitry and receive path circuitry configured to communicate with a wireless network, the method comprising:
- by a digital camera of the mobile device, recording an image;
- generating a live video stream including the recorded image;
- analyzing, by one or more processors in the mobile device, the live video stream;
- detecting in the live video stream, by the one or more processors, a gesture in captured frames from the live video stream of the recorded image;
- identifying the gesture by comparing a pattern of the gesture from one of the captured frames to a plurality of gestures stored in a memory of the mobile device, the plurality of gestures including one or more preconfigured gestures and one or more customized gestures;
- in response to identifying the gesture, selecting, as a function of the identified gesture, a corresponding operation from a plurality of operations associated with respective ones of the plurality of gestures;
- performing, by the one or more processors, the operation corresponding with the identified gesture; and
- when the mobile device is in a gesture learn mode, the method further comprises:
    - capturing frames from the live image stream for a predetermined period of time;
    - providing an indication at an end of the predetermined period of time;
    - learning a customized gesture selected from the captured frames; and
    - associating the selected customized gesture with a selected system operation.

* * * * *